United States Patent [19]
Lipo

[11] Patent Number: 4,573,003
[45] Date of Patent: Feb. 25, 1986

[54] AC MACHINE OPTIMIZED FOR CONVERTER OPERATION

[75] Inventor: Thomas A. Lipo, Madison, Wis.

[73] Assignee: Wisconsin Alumni Research Foundation, Madison, Wis.

[21] Appl. No.: 753,820

[22] Filed: Jul. 9, 1985

Related U.S. Application Data

[63] Continuation of Ser. No. 537,968, Sep. 30, 1983, abandoned.

[51] Int. Cl.⁴ .......................... H02P 5/40; H02K 3/18
[52] U.S. Cl. .................................. 318/722; 318/138; 318/254; 310/269; 310/264
[58] Field of Search ............... 310/269, 216, 261, 264, 310/12; 318/254, 138, 722, 723

[56] References Cited

U.S. PATENT DOCUMENTS

| | | |
|---|---|---|
| 1,334,831 | 3/1920 | Bergman . |
| 1,401,996 | 1/1922 | Lundell . |
| 2,235,075 | 3/1941 | Kimball .............. 310/186 |
| 2,394,075 | 2/1946 | Kimball . |
| 2,449,506 | 9/1948 | Pollard .............. 310/269 |
| 3,215,875 | 11/1965 | Latta .............. 310/269 |
| 3,495,106 | 2/1970 | Lenders .............. 310/269 |
| 3,634,707 | 1/1972 | Tillner et al. .............. 310/269 |
| 3,780,324 | 12/1973 | Greenwell . |
| 3,873,897 | 3/1975 | Muller .............. 318/254 A |
| 3,956,678 | 5/1976 | Byrne et al. .............. 318/254 |
| 4,309,643 | 1/1982 | Acamatsu . |
| 4,398,134 | 8/1983 | Muller .............. 318/254 |

FOREIGN PATENT DOCUMENTS 2713567  5/1978  Fed. Rep. of Germany ...... 310/269

OTHER PUBLICATIONS

Rosenberg, R., *Electric Motor Repair*, Holt, Rinehart & Winston, 1970, pp. 100–107, 113–115.
F. W. Maxstadt, "Obtaining Steady High-Voltage Direct Current from a Thermionic Rectifier without a Filter," *Trans. AIEE*, vol. 43, Nov. 1924, pp. 1055–1057.
M. Stohr, "The Rated Output of Commutatorless Inverter Motors having a Simple Six-Phase Connection," *Archiv. fur Elektrotechnik*, vol. 32, 1938, pp. 691–720.
M. Stohr, "The Rating of Brushless Converter Motors with Improved Motor Connections," *Archiv. fur Elektrotechnik*, vol. 32, 1938, pp. 767–784.
W. Leitgeb, "The Unit Capacity of Converter-Fed Synchronous Machines in Connection with Various Number of Phases and Types of Circuits," *Archiv. fur Elektrotechnik*, vol. 57, Jun. 1975, pp. 71–84.

Primary Examiner—David Smith, Jr.
Attorney, Agent, or Firm—Isaksen, Lathrop, Esch, Hart & Clark

[57] ABSTRACT

An electrical machine is disclosed, capable of functioning as either a motor or generator, which has a salient pole rotor (23) and a stator having multiple phase windings (21) each comprising a concentrated, full pitch winding with one stator slot per pole per phase. The pole faces (27) of the salient poles of the rotor may be tapered to produce an air gap which increases from the front to the back of the pole face to counter the effect of armature reaction MMF. The taper of the pole faces is selected such that the resultant total flux density in the air gap from field and armature currents is quasi-rectangular. The quasi-rectangular flux densities rotating in the air gap produce quasi-rectangular phase voltages and currents when the machine is operated as a generator, and, when operated as a motor, the machine is adapted to accept quasi-rectangular supply currents or voltages of the type readily produced by variable frequency converter power supplies.

34 Claims, 11 Drawing Figures

4,573,003

AC MACHINE OPTIMIZED FOR CONVERTER OPERATION

TECHNICAL FIELD

This application is a continuation of application Ser. No. 537,968, filed Sept. 30, 1983, now abandoned.

This invention pertains generally to the field of electrical motors and generators; in particular, it relates to motors adapted to be driven by solid state converters and to AC generators adapted to supply power to a rectifier load.

BACKGROUND ART

Since the development of the thyristor, many varieties of power conversion equipment have been utilized as adjustable frequency power supplies for AC motors. Variable frequency drives with AC machines are now commonly used where speed control is required and substantial effort has been devoted toward the development of drives that are efficient and practical. However, the now common use of variable frequency drives has thus far not resulted in a significant change in the design of the AC machines which are used in such systems. In general, where AC machines are to be operated with solid state, adjustable frequency power sources, this fact has only influenced the selection of the design values of the conventional parameters of the machine—for example, rotor resistance and leakage reactance in the case of an induction motor or q-axis rotor resistance and magnetizing reactance in the case of a reluctance motor.

Considerable effort has been directed to the development of solid state converters in which the harmonic content of the output voltage is minimized. The object of these designs is to produce a rotating field within the machine having a minimum of time harmonics. This objective is pursued because conventional AC machines generally have sinusoidally distributed windings which are optimally suited to be driven by pure sinusoidal power sources. In machines designed in this manner, space and time harmonics are minimized, and the air gap field becomes essentially sinusoidally distributed. However, even converter systems which seek to provide a driving wave form which simulates a sinusoid normally produce only a step-wise approximation, resulting in the introduction of unwanted harmonics and a reduction in power conversion efficiency from that obtainable with pure sinusoidal power. In addition, in machines driven with sinusoidal power only about one third of the active iron core is near saturation at any instant and the iron is effectively underutilized.

Similar inefficiencies are encountered where AC generators are used to provide power to a DC load through a rectifier. AC generators are conventionally designed to provide a pure sine wave output voltage which, when rectified, yields a DC voltage having a substantial "ripple" component. If the ripple component must be eliminated or reduced, additional filtering elements are required and energy may be lost in the filter, reducing the overall generating efficiency.

SUMMARY OF THE INVENTION

The AC machine of the invention is constructed such that the stator and rotor flux densities add to provide a nearly rectangular flux density wave traveling in the air gap. The stator incorporates multiple phase windings with each of the stator phases comprising concentrated, full pitch windings having one stator slot per pole per phase. The rotor has a field structure with salient poles. To counter the effect of armature reaction MMF, the rotor pole faces may be tapered to produce an air gap of varying length, increasing from the front to the back of the pole face when operated as a motor. The taper of the pole faces is selected such that the resultant total MMF in the air gap from field and armature currents is quasi-rectangular at rated field current and rated load. Appropriately formed pole face windings may alternatively be used with a uniform air gap between rotor and stator to counter armature reaction.

The quasi-rectangular flux densities in the air gap allow the iron in the machine to be more fully utilized—closer to saturation—than in conventional machines driven with sinusoidal or quasi-sinusoidal power. The improved power density in the machine allows greater torque output with the same power input and with no increase in the size and expense of the machine.

When used as a generator, the machine produces quasi-rectangular output voltages which can be rectified to yield a DC voltage having a ripple magnitude much less than that encountered in conventional AC generators which produce sinusoidal output voltages.

Further objects, features and advantages will be apparent from the following detailed description when taken in conjunction with the accompanying drawings showing a preferred embodiment of the invention.

BEST MODE FOR CARRYING OUT THE INVENTION

Sinusoidally wound AC machines are presently almost the only type of machine used with either fixed or adjustable frequency power supplies. However, other winding configurations are possible, and machines can be constructed to generate counter electromotive forces (EMFs) of an arbitrary wave form. It can be generally shown that the sinusoidal winding, as well as most winding distributions having a non-sinusoidal winding wave form, are inefficient when used with converter power supplies which provide square wave type power. It can be shown that, of a set of machines having various winding configurations chosen such that the total flux will be the same in each machine and the stator core cross-section as well as the stator copper cross-sectional area will be the same (so that all machines have the same frame size), the greatest air gap power is obtained with a machine having an air gap phase voltage shown by the graph line labeled 15 and phase current indicated by the line labeled 16 in FIG. 1. It is noted that the phase voltage and current are quasi-rectangular in form, which is compatible with the voltages and currents that can be easily derived from a bridge-type switching power converter. The permissible maximum voltage for the wave form 15 which can be supported without exceeding the available core flux is 0.955 times that of a conventional sinusoidally wound machine supplied with sinusoidal power. The peak current must be reduced to 0.866 of the peak sine wave current to keep losses in the machine the same. However, the power which can be derived from a machine utilizing the wave forms 15 and 16 can be as large as 1.10 times the power available from a conventional sinusoidally wound machine fed with sinusoidal power.

Figure 1:
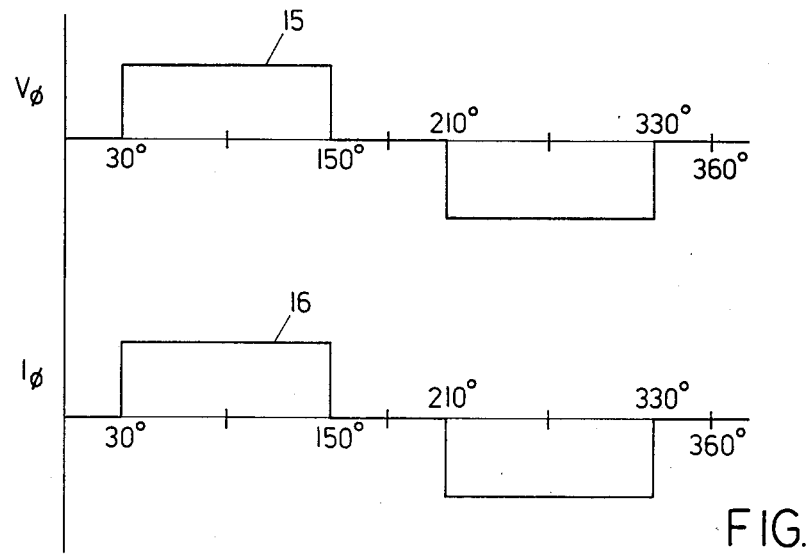
FIG. 1 is a diagram of the desired air gap phase voltage and phase current for a quasi-rectangular wave machine in accordance with the invention.
Figure 2:
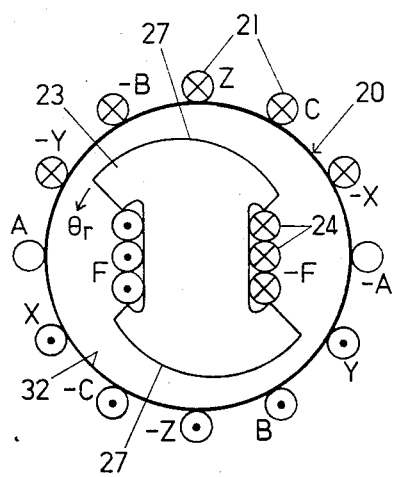
FIG. 2 is a simplified schematic view of an elementary two pole machine in accordance with the invention.
Figure 3:
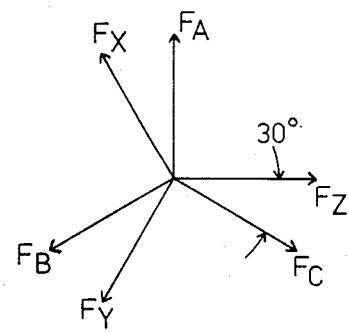
FIG. 3 is a diagram showing the spatial orientation of the six stator phases of the machine of FIG. 2 relative to one another.

An elementary two pole machine capable of providing the voltage and current wave forms of FIG. 1 is shown generally at 20 in FIG. 2 in a simplified diagrammatic cross-sectional form. The machine 20 has stator phase windings 21 composed of six phases labeled A, B, C, X, Y, Z in FIG. 2, distributed evenly about the inner periphery of the stator. All phases are constructed from concentrated full pitch coils so that the stator core (not shown in FIG. 2) has one slot per pole per phase. The six phase windings can be segregated into a pair of groups of three windings each in which each phase within a group is displaced by 120° from adjacent phases within the group. The two groups can thus be considered as mutually displaced by 30°, as illustrated in the diagram of FIG. 3 showing the effective direction of a positive reference magnetic field for each of the six phase windings. This type of winding connection is sometimes referred to as an asymmetric six phase connection. More generally, where the number m of stator phases is a multiple of three, the windings can be considered as consisting of groups of three equally spaced windings, with each group spaced from one another by 180°/m. The per unit pole arc chosen is 0.66; that is, the rotor pole spans 120 electrical degrees.

Figure 4:
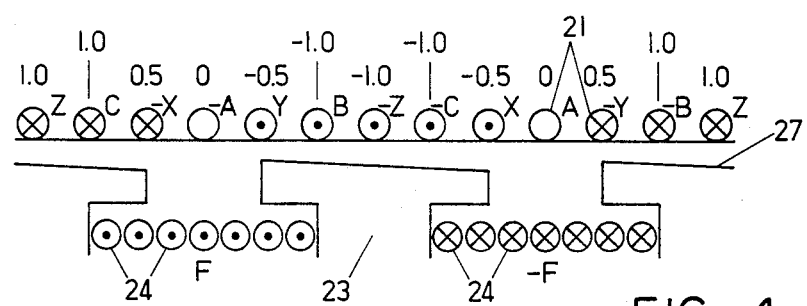
FIG. 4 is a linear equivalent diagram of the machine of FIG. 2.

The rotor includes a salient pole core 23 having a pole arc of 120°, with a field winding 24 uniformly distributed over the interpolar gap. The rotor and stator windings are portrayed in equivalent linear fashion in the view of FIG. 4.

Figure 5:
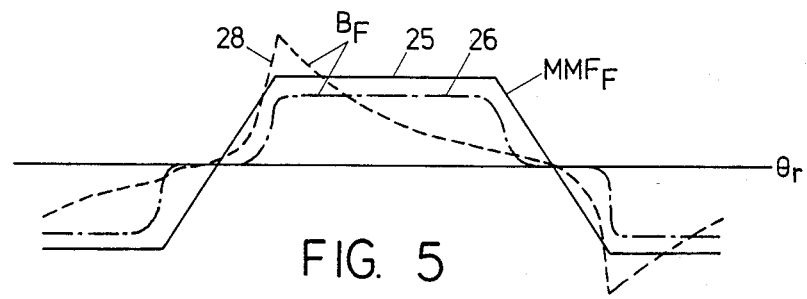
FIG. 5 is a graph of the flux density and MMF of the field as a function of angular position in the machine of FIG. 2.

Under the foregoing assumption that the field winding is uniformly distributed over the interpolar gap, the variation in field magneto-motive force (MMF) is illustrated by the trapezoidal solid line labeled 25 in FIG. 5. If the field pole were designed in a conventional manner, that is, with a uniform gap under the pole arc, the corresponding flux density produced by this MMF would be rectangular in nature, as shown illustratively by the dot-dashed line labeled 26 in FIG. 5. In principle, such a wave form is precisely the variation desired if the air gap voltage is to have quasi-rectangular form of FIG. 1. However, the air gap voltage is proportional to the field air gap flux only on open circuit. When the machine is subjected to armature load current, the net flux becomes distorted by the resulting armature ampere-turns. In accordance with the present invention, the flux resulting from armature load current is compensated by tapering the rotor pole faces 27 in anticipation of the armature ampere turns which appear upon loading of the armature. If the pole faces are tapered for generating operation, such that the gap increases when moving from the front of the pole, as viewed from the direction of rotation, to the rear of the pole, the air gap flux produced by the field is distorted and assumes the shape of the dashed line labeled 28 in FIG. 5.

Figure 6:
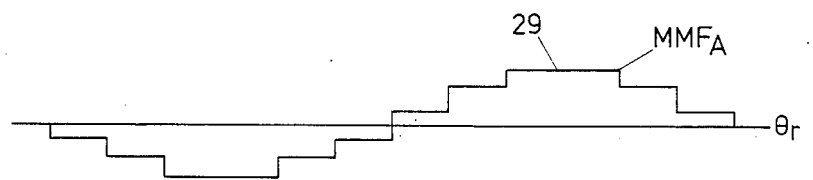
FIG. 6 is a graph of the MMF resulting from armature current as a function of angular position in the machine of FIG. 2.
Figure 7:
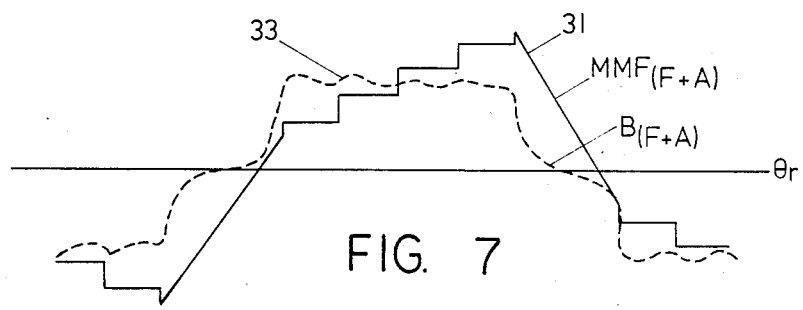
FIG. 7 is the net resultant MMF and flux density from the field and armature.

The effect of the armature current may be analyzed by assuming that the air gap voltage and phase currents are in phase and that the currents supplied to the six phases of the machine are the 120° quasi-rectangular blocks shown by the graph labeled 16 in FIG. 1. Referring to FIG. 2, the currents flowing in the six windings are shown for the time instant in which the phase A current is 0 and the line current is in the process of transferring from phase X to phase Y. The phase X current is assumed to be one half the nominal maximum current and is decreasing to 0 while the phase Y current is one half the nominal current and is increasing to its maximum. Current flow in the six windings A, B, C, X, Y, Z with respect to the maximum current is therefore, respectively, 0, 1, −1, 0.5, 0.5, and −1 at the instant shown and with the currents in the X and Y windings assumed to be in the process of commutation. The sum of the MMFs of the six concentrated stator coils is illustrated by the graph labeled 29 in FIG. 6. It may be noted that the MMF produced by the stator current is located 90° electrical behind the field MMF during motoring operation. The total MMF in the air gap as a result of the spatial superposition of the field and armature MMFs is the asymmetric staircase function shown at 31 in FIG. 7. However, if the rotor pole faces are properly designed, the effects of the asymmetrical gap between the pole face 27 and the inner periphery 32 of the stator core and the asymmetrical MMF substantially cancel so that the resultant flux density in the gap becomes the quasi-rectangular shape shown at 33 in FIG. 7. Although ripples remain due to stator slotting, the air gap flux approximates the same shape as the stator input currents. The rotor pole faces may also be tapered in discrete steps, rather than being smoothly tapered, with the width of each step preferably corresponding to the spacing between stator slots containing the concentrated windings.

All six stator windings 21 are full pitch, concentrated coils. Hence, if the shape of the air gap flux density is considered as fixed but rotating synchronously with the rotor, the voltage induced in each of the six concentrated stator windings will be directly proportional to the resulting flux density wave shape and also in phase with its respective winding current. In this manner, the ideal voltage and current wave forms of FIG. 1 can be approximated.

The necessary dimensions of the air gap taper resulting from the inwardly spiraling rotor pole faces is determined for a single ratio of field to armature MMF. If distortion of the quasi-rectangular counter EMF is to be avoided under changes in load, the field MMF must be changed in proportion to the armature current, as by series connection of the field and armature.

Figure 8:
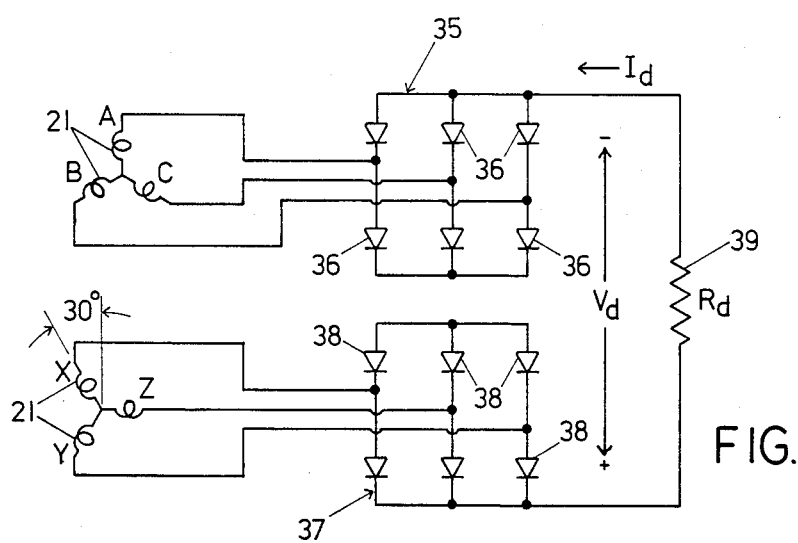
FIG. 8 is an electrical schematic diagram of the armature phases of the machine of FIG. 2 connected in a diode bridge resistive load circuit.

When utilized in the generator configuration, the stator coils 21 may be connected through a rectifier to supply DC power to a load. As illustrated in FIG. 8, one group of stator phase windings 21 (A, B, C) may be connected to a first rectifier bridge 35 consisting of diodes 36, and the second group of stator windings 21, (phases X, Y, Z) may be connected to a second rectifier bridge 37, consisting of diodes 38. Gate controlled thyristors can be substituted for the diodes to provide a controlled rectification capability. The bridges 35 and 37 are connected in series and the voltages across the two bridges add to yield a DC voltage $V_d$ applied across a load indicated by the resistor 39. A DC link inductor, normally utilized to smooth the DC current, is not necessary since the quasi-rectangular output voltages provided from the stator windings yield a rectified DC voltage $V_d$ with a relatively small time varying "ripple" component. The harmonics remaining on the DC voltage derived from the machine 20 by rectification are generally found to be due primarily to slot harmonics and can be minimized by reducing the size of the slot openings.

The concentrated winding machine 20 can also be operated in the motoring mode. A primary consideration is proper selection of an inverter suited for driving the machine by producing the desired quasi-rectangular wave forms supplied to the armature windings. Generally, it is preferred that the inverter control the current supplied to the phase windings to conform to the 120° blocks shown at 16 in FIG. 1. DC current can be supplied to the rotor field winding in a conventional manner through brushes, slip rings, magnetically coupled exciters or the like.

To eliminate spikes that appear in the phase voltages as a result of rapid commutation, it is possible to utilize amortisseur windings, not shown, in a conventional manner. The rotor itself may also be of the permanent magnet type, dispensing with the field windings 24. The permanent magnet forming the rotor core provides a substantially uniform MMF over the pole arc, replacing the field winding 24 as the means by which the MMF is produced. The pole faces of the permanent magnet core need not be tapered in the manner of the pole faces 27 of FIG. 2 since the permanent magnet effectively acts as an air gap, diminishing the armature reaction effect. The armature reaction effect may be sufficiently small that little or no taper is necessary to obtain a substantially rectangular flux density wave in the air gap.

Figure 9:
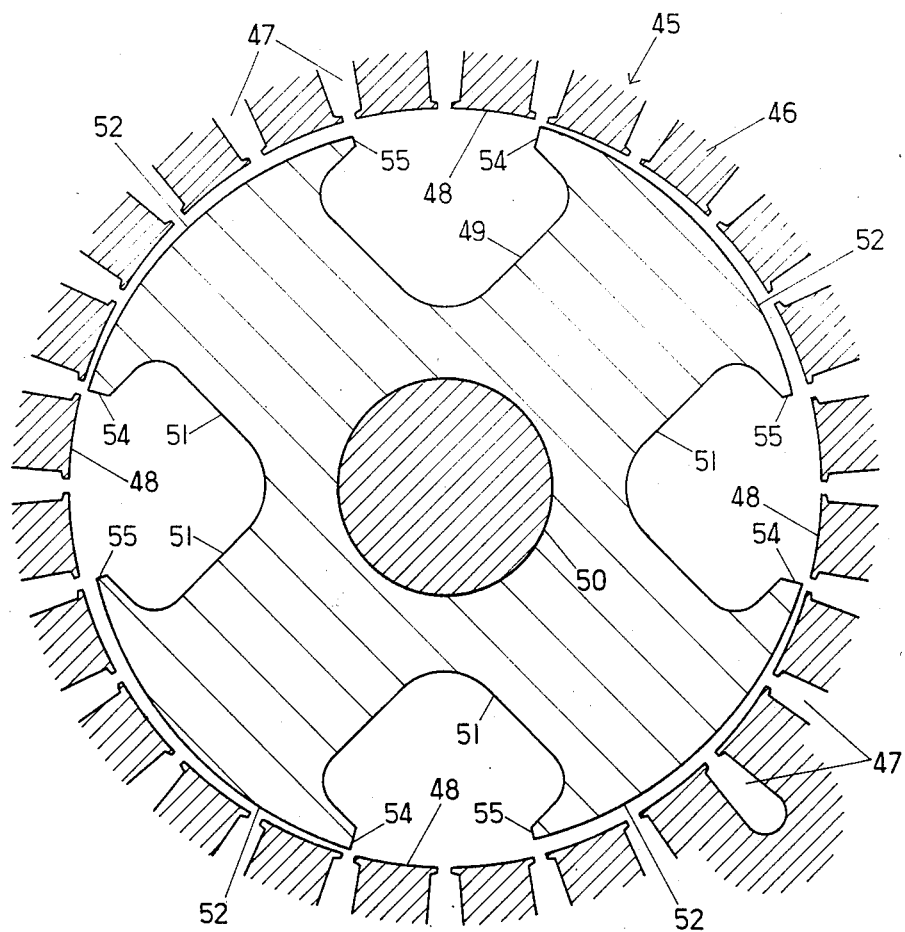
FIG. 9 is a cross-sectional view of the rotor and stator cores of an embodiment of the machine having a four pole rotor.

Although the principles of the present invention have been illustrated with respect to the two pole, six phase machine of FIG. 2, it is noted that, generally, more than one pair of rotor poles may be utilized and any number of phases can be selected. Higher numbers of phases tend to improve the performance of the machine, but realistic converter bridge configurations dictate that the preferred number of phases be multiples of three. Because each stator phase winding is concentrated in one slot for each direction of current flow, the number of stator slots required is equal to the number of poles times the number of phases. The machine of FIG. 2 is thus a six phase, two pole machine having twelve stator slots to accommodate the six concentrated phase windings. A four pole, six phase machine is illustrated in simplified cross-section in the view of FIG. 9 at 45. The machine 45 has a stator core 46 with twenty-four slots 47 evenly spaced about the cylindrical inner periphery 48 of the stator core. The rotor core 49, mounted for rotation on a shaft 50, has four extending pole portions 51, each with pole faces 52 having a pole arc of 60° mechanical or 120° electrical. The stator and rotor windings are not shown in FIG. 2. For illustration, each phase of the stator windings of the machine 45 can consist of two circuits which can be connected either in parallel or series, with each coil having a full pitch winding with a plurality of turns. The pole faces 52 are constructed to have a spiral shape such that the physical air gap between the pole face and stator inner periphery 48 increases linearly from the front or leading edge 54 of each pole face to the back or trailing edge 55. As an example of preferred relative dimensions, for a rotor having an approximate maximum diameter of 6.81 inches (17.3 cm) and a stator with a cylindrical inner periphery, the physical air gap may increase from 0.032 inches (0.08 cm) at the front edge 54 to 0.162 inches (0.41 cm) at the trailing edge 55 due to the smooth inward spiral taper of the rotor pole faces.

Figure 10:
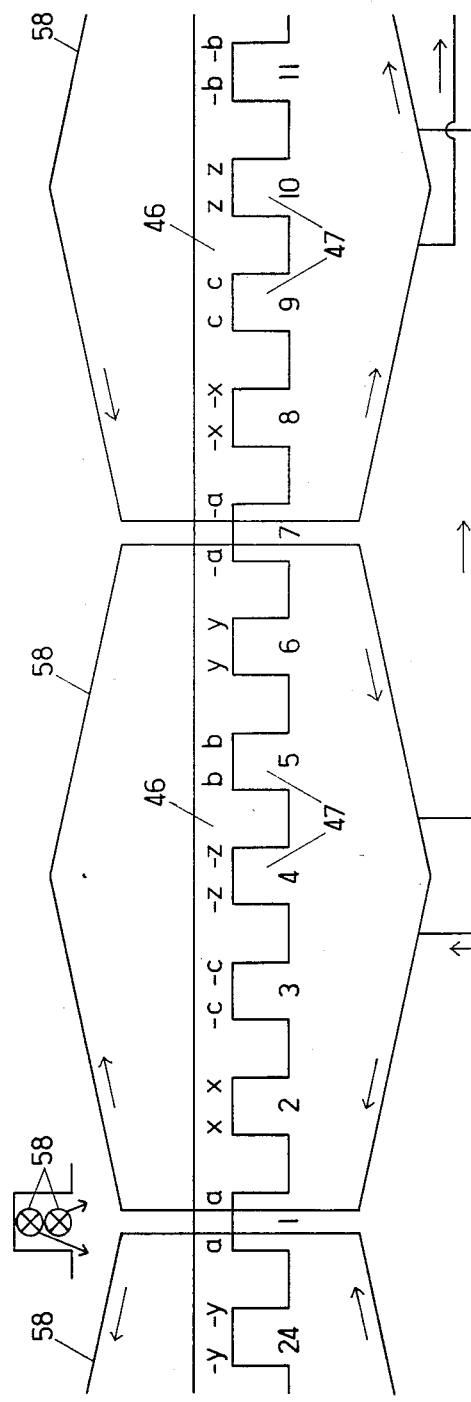
FIG. 10 is a diagram showing the winding connections for one phase of the stator windings of the machine of FIG. 9.
Figure 10:
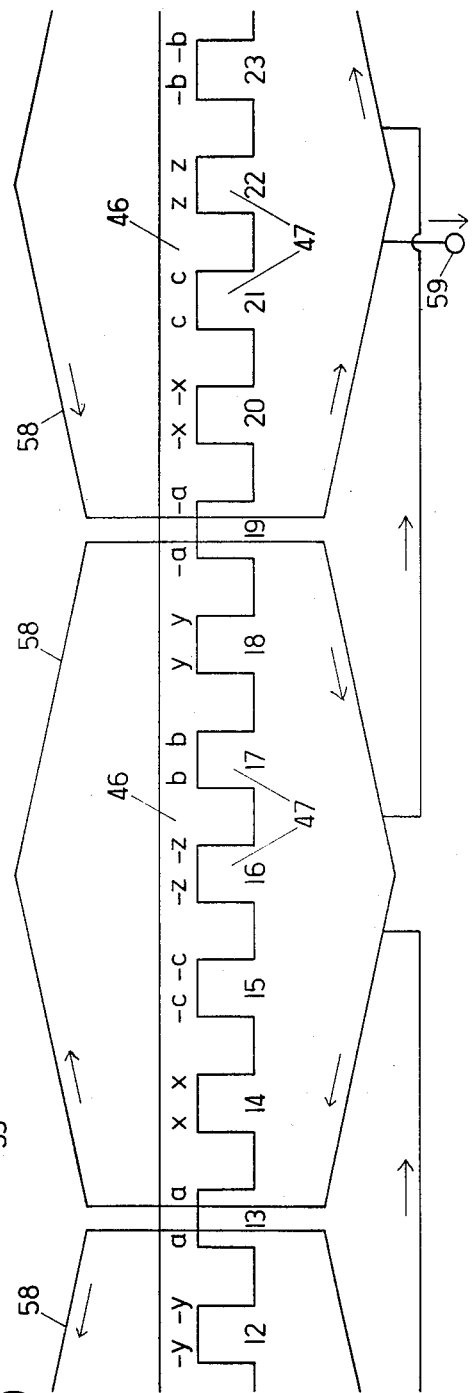

An illustrative linearized winding distribution for one phase, phase A, of the stator of the machine 45 is shown in FIG. 10. Each slot 47 has two coils 58 therein and each phase preferably has a pair of separate phase terminals 59. The other phases which are not shown in FIG. 10 have a winding distribution identical to that shown for phase A.

Figure 11:
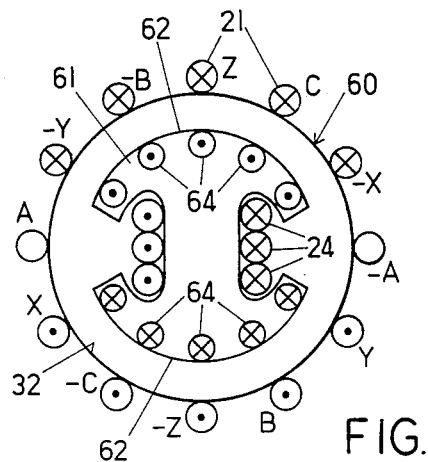
FIG. 11 is a simplified schematic view of another embodiment of an elementary two pole machine.

As explained above, the tapered pole faces counteract the effect of armature reaction to yield a quasi-rectangular flux density wave. The armature reaction may also be compensated with pole face windings in a manner similar to that used in DC machines, as illustrated in the simplified cross-sectional view of a two-pole machine 60 in FIG. 11. The machine 60 has a stator identical to that of the machine 20, including six full pitch, concentrated windings 21. The rotor 61 has two salient poles with smooth, cylindrical pole faces 62, so that the air gap between the pole faces 62 and the inner periphery 32 of the stator core is uniform. The field winding 24 is uniformly distributed over the interpolar gap. A set of pole face windings 64 are formed in the rotor such that the ampere-turns in the pole face windings will be substantially equal in magnitude and opposite in direction to the ampere-turns in the concentrated stator windings to counteract the effect of armature reaction. The armature and pole face ampere-turns will substantially cancel, so that the resultant MMF and flux density in the air gap corresponds primarily to the quasi-rectangular form of the field MMF.

It is understood that the invention is not confined to the particular construction and arrangement of parts illustrated and described herein, but embraces such modified forms thereof as come within the scope of the following claims.

What is claimed is:

1. An electrical machine comrising:
    (a) A stator including a core with a cylindrical inner periphery and slots formed therein, and a stator winding having a plurality of phases, each phase formed of a concentrated, full pitch winding disposed in one slot per pole, per phase for each direction of current flow;
    (b) A rotor having salient poles with pole faces and means for producing a magnetomotive force over each pole such that the resultant of the rotor field and stator armature flux densities is a quasi-rectangular flux density wave in the air gap between the rotor and stator having the maximum flux density between each pole face and the stator.

2. The machine of claim 1 wherein the stator has a core with a cylindrical inner periphery and slots formed therein and wherein each stator phase winding is concentrated in one slot for each direction of current flow.

3. The machine of claim 1 wherein the number of stator slots is equal to the number of poles times the number of phases.

4. The machine of claim 1 wherein the number of stator phases is a multiple of three and the stator phase windings are arranged about the periphery of the stator in groups of three windings spaced equally from one another about the periphery of the stator, each group displaced spatially from one another by 180°/m, where m is the number of phases.

5. The machine of claim 4 wherein the stator has six phase windings separated into two groups of three windings, each winding in a group displaced from the other windings in the group by 120°, and the two groups mutually displaced by 30°.

6. The machine of claim 5 wherein each rotor pole face spans 120 electrical degrees.

7. The machine of claim 1 wherein the rotor has a core with tapered pole faces and an interpolar gap, and including a field winding wound about the core in the interpolar gap.

8. The machine of claim 1 wherein the rotor is formed of a permanent magnet.

9. The machine of claim 1 wherein each rotor pole face spans 120 electrical degrees and the pole faces are separated by 60 electrical degrees.

10. The machine of claim 1 including a plurality of devices selected from the group consisting of diodes and thyristors connected to the stator windings in a bridge configuration to provide rectification of the phase voltages to a DC voltage.

11. The machine of claim 1 wherein the rotor has four poles and the stator has a core with six full pitch phase windings concentrated in twenty-four slots distributed over the inner periphery of the core.

12. The machine of claim 1 wherein the rotor poles have pole faces tapered from one edge to the other with a smooth inward spiral.

13. The machine of claim 1 wherein the rotor has pole face windings formed such that the ampere-turns in the pole face windings will be substantially equal in magnitude and opposite in direction to the ampere-turns in the concentrated stator windings to counteract the effect of armature reaction.

14. An electrical machine comprising:
(a) a stator including a core with a cylindrical inner periphery and slots formed therein and a stator winding having a plurality of phases, each phase formed of a concentrated, full pitch winding disposed in one slot per pole, per phase for each direction of current flow;
(b) a rotor having salient poles and a core with pole faces and an interpolar gap, and means for producing a magnetomotive force over each pole, including pole faces tapered inwardly from one edge to the other and a field winding wound about the core in the interpolar gap, such that the resultant of the rotor field and stator armature flux densities is a quasi-rectangular flux density wave in the air gap between the rotor and stator having the maximum flux density between each pole face and the stator.

15. The machine of claim 14 wherein the stator has a core with a cylindrical inner periphery and slots formed therein and wherein each stator phase winding is concentrated in one slot for each direction of current flow.

16. The machine of claim 15 wherein the number of stator slots is equal to the number of poles times the number of phases.

17. The machine of claim 14 wherein the number of stator phases is a multiple of three and the stator phase windings are arranged about the periphery of the stator in groups of three windings spaced equally from one another about the periphery of the stator, each group displaced spatially from one another.

18. The machine of claim 17 wherein the stator has six phase windings separated into two groups of three windings, each winding in a group displaced from the other windings in the group by 120°, and the two groups mutually displaced by 30°.

19. The machine of claim 18 wherein each rotor pole face spans 120 electrical degrees.

20. The machine of claim 14 wherein the rotor has a core with tapered pole faces and an interpolar gap, and including a field winding wound about the core in the interpolar gap.

21. The machine of claim 14 wherein the rotor is formed of a permanent magnet.

22. The machine of claim 14 wherein each rotor pole face spans 120 electrical degrees and the pole faces are separated by 60 electrical degrees.

23. The machine of claim 14 including a plurality of devices selected from the group consisting of diodes and thyristors connected to the stator windings in a bridge configuration to provide rectification of the phase voltages to a DC voltage.

24. The machine of claim 14 wherein the rotor has four poles and the stator has a core with six full pitch phase windings concentrated in twenty-four slots distributed over the inner periphery of the core.

25. The machine of claim 14 wherein the rotor poles having pole faces tapered from one edge to the other with a smooth inward spiral.

26. The machine of claim 14 wherein the rotor pole faces taper inwardly from the front edge to the back edge of each pole with respect to the direction of rotation for motoring operation.

27. An electrical machine comprising:
(a) a stator including a core having slots therein distributed over the inner periphery of the core, and a stator winding having a plurality of phases, each phase formed of a concentrated full pitch winding disposed in a core slot per pole, per phase for each direction of current flow;
(b) a rotor having salient poles including a rotor core with pole faces tapering inwardly from one edge of the pole face to the other and an interpole gap between the salient poles, a field winding wound about the core in the interpolar gap, the taper of the pole faces selected such that the resultant of the rotor field and stator armature flux densities is a quasi-rectangular flux density wave in the air gap between the rotor and stator at a chosen field current and a chosen load having a maximum flux density between each pole face and the stator.

28. The machine of claim 27 wherein the stator has a core with a cylindrical inner periphery and slots formed therein and wherein each stator phase winding is concentrated in one slot for each direction of current flow.

29. The machine of claim 28 wherein the number of stator slots is equal to the number of poles times the number of phases.

30. The machine of claim 27 wherein the number of stator phases is a multiple of three and the stator phase windings are arranged about the periphery of the stator in groups of three windings spaced equally from one another about the periphery of the stator, each group displaced spatially from one another.

31. The machine of claim 30 wherein the stator has six phase windings separated into two groups of three windings, each winding in a group displaced from the other windings in the group by 120°, and the two groups mutually displaced by 30°.

32. The machine of claim 27 wherein each rotor pole face spans 120 electrical degrees.

33. The machine of claim 27 including a plurality of devices selected from the group consisting of diodes and thyristors connected to the stator windings in a bridge configuration to provide rectification of the phase voltages to a DC voltage.

34. The machine of claim 27 wherein the rotor pole faces taper inwardly from the front edge to the back edge of each pole with respect to the direction of rotation for motoring operation.

* * * * *